United States Patent [19]

Kiyokawa

[11] Patent Number: 5,560,812

[45] Date of Patent: Oct. 1, 1996

[54] METHOD FOR PRODUCING A METAL FILM RESISTOR

[75] Inventor: Hajime Kiyokawa, Fukui, Japan

[73] Assignee: Kiyokawa Plating Industries Co., Ltd., Fukui-ken, Japan

[21] Appl. No.: 356,732

[22] Filed: Dec. 15, 1994

[30] Foreign Application Priority Data

Dec. 16, 1993 [JP] Japan ............................. 5-317084

[51] Int. Cl.⁶ .............................. C25D 3/58; C23C 28/02
[52] U.S. Cl. ........................ 205/163; 205/224; 205/239
[58] Field of Search ............................ 205/122, 163, 205/224, 239

[56] References Cited

U.S. PATENT DOCUMENTS

| | | | |
|---|---|---|---|
| 3,833,481 | 9/1974 | Olson et al. | 205/102 |
| 4,454,495 | 6/1984 | Werner et al. | 338/195 |

FOREIGN PATENT DOCUMENTS

| | | | |
|---|---|---|---|
| 58-133391 | 8/1983 | Japan | C25D 3/58 |

OTHER PUBLICATIONS

Abner Brennet, Electrodeposition of Alloys, Principles and Practice, Academic Press, New York, 1963, vol. I, pp. 558–566.

Ishikawa et al., "Copper–Nickel Alloy Deposition From Pyrophosphate Bath Containing Thioglycolic Acid", 1980, pp. 35–39.

F. A. Lowenheim, *Electroplating*, McGraw–Hill Book Co., New York, 1978, pp. 374–377, 416–423.

*Primary Examiner*—John Niebling
*Assistant Examiner*—William T. Leader
*Attorney, Agent, or Firm*—Cushman Darby & Cushman, L.L.P.

[57] ABSTRACT

A method for producing a metal film resistor including at least an insulating substrate, a resistor film of copper-nickel alloy formed on the surface of the insulating substrate, and a pair of terminals which are in contact with the resistor film is provided. The method includes a step of depositing the copper-nickel alloy by electroplating from an aqueous pyrophosphate bath containing a copper salt and a nickel salt at a bath temperature of 20°–40° C. and a pH of 6–8.

7 Claims, 16 Drawing Sheets

F I G. 3
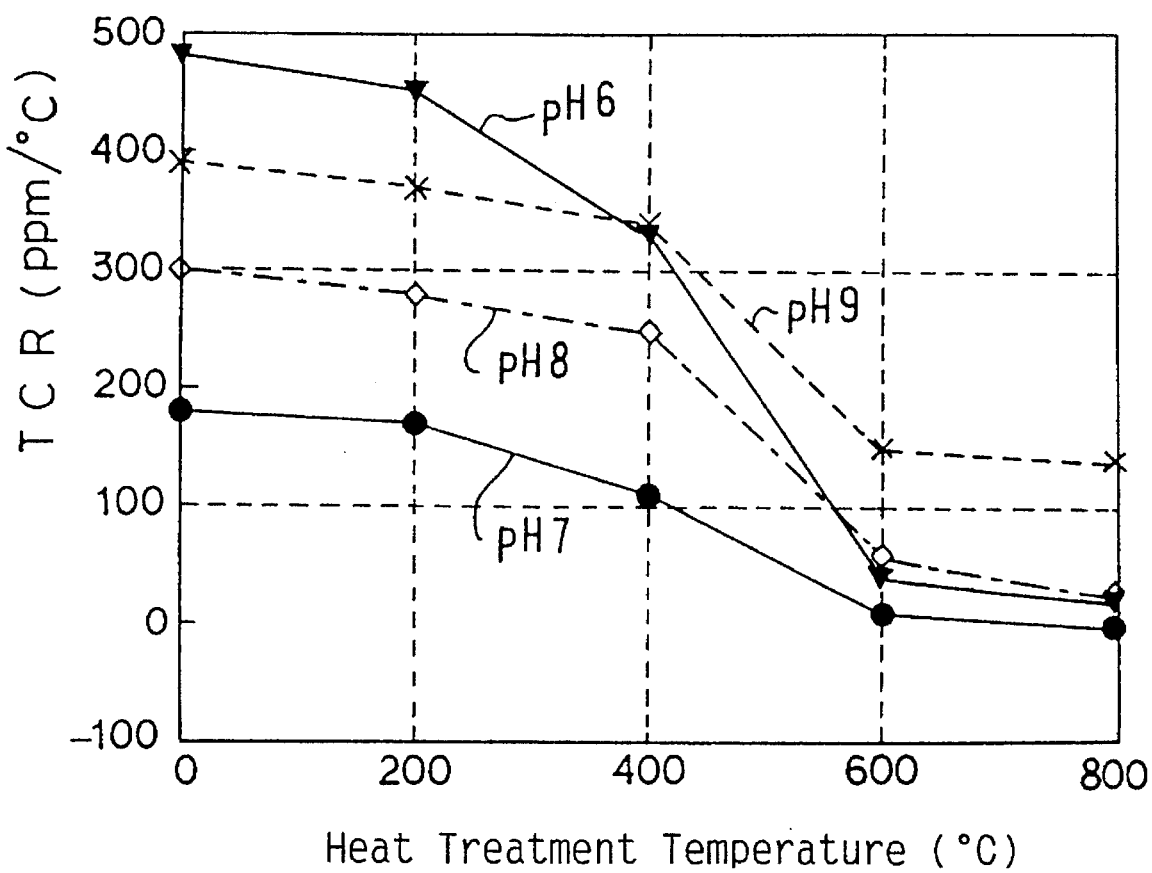

METHOD FOR PRODUCING A METAL FILM RESISTOR

BACKGROUND OF THE INVENTION

1. Field of the Invention

The present invention relates generally to a metal film resistor and, in particular, to a method for producing a metal film resistor.

2. Description of the Related Art

Metal film resistors have wide application for configuring circuits in various electric appliances and measuring instruments. For such a metal film resistor, such characteristics as a precision resistor having a wide resistance region ranging from a high resistance to a low resistance as low as 10 m$\Omega$ have recently been required. An excellent temperature coefficient of resistance as well as a small tolerance in electrical resistance value, as small as ±1%, is also required.

Conventionally, a metal film resistor employing a copper-nickel alloy film has been known as a resistor which can be applied to usage from a high resistance region to a low resistance region and is excellent in its temperature coefficient of resistance. Such a resistor is generally produced by laminating a multiplicity of copper and nickel films which are alternately and electrolytically deposited on an insulating substrate of porcelain material, and then carrying out a heat-treatment of the laminated films at a high temperature of about 800° C. to form a copper-nickel alloy film.

As an alternative metal film resistor of ultra-precision which is particularly excellent in the temperature coefficient of resistance, there is known a resistor employing a vapor-deposited film of nickel-chromium. The resistor has the characteristics of a temperature coefficient of resistance as small as ±10 ppm/°C. and of a tolerance in the resistance value as small as ±1%.

The afore-mentioned former copper-nickel alloy film resistors, however, have disadvantage of requiring a heat-treatment at a high temperature, as high as about 800° C. for converting the electrochemically deposited layers of copper and nickel films into a homogeneous alloy. Furthermore, their resistance values are liable to change during the heat-treatment step at such a high temperature, and their manufacturing cost is high because their production requires a large quantity of electric power. In addition, the temperature coefficient of resistance of the obtained resistor is not satisfactory, only showing ±250 ppm/°C.

The latter metal film resistors employing the vapor-deposited nickel-chromium alloy film have a disadvantage that the formation of a thick film is difficult because their nickel-chromium film is formed by vapor-deposition. Therefore, in such type resistors, only those having a high resistance in a range from 100 $\Omega$ to 100 k$\Omega$ can be produced.

SUMMARY OF THE INVENTION

It is therefore a primary object of the present invention to provide a method for producing a metal film resistor of resistances in a wide range of from high resistance to low resistance and is also excellent in the temperature coefficient of resistance.

The present invention provides a method for producing a metal film resistor including at least an insulating substrate, a resistor film of copper-nickel alloy formed on the surface of the insulating substrate, and a pair of terminals which are in contact with the resistor film, the method comprising a step of depositing the copper-nickel alloy by electroplating from an aqueous pyrophosphate bath containing a copper salt and a nickel salt.

In a preferred embodiment of the present invention, the step of depositing copper-nickel alloy comprises electrolyzing an aqueous pyrophosphate bath containing $CuSO_4 \cdot 5H_2O$ in 0.005–0.030 mole/L, $NiSO_4 \cdot 6H_2O$ in 0.07–0.30 mole/L and $K_4P_2O_7$ in 0.20–0.50 mole/L at a bath temperature of 20°–40° C. and a pH of 6–8 to deposit copper-nickel alloy film with a copper ratio of from 40 to 65 wt %.

In the method, according to the invention, for producing a metal film resistor, it is preferable to deposit copper-nickel alloy by employing copper and nickel as separate anodes and to distribute the plating current between the copper anode and the nickel anode in a predetermined constant ratio, thereby to cause the concentration ratio of nickel ion to cuprous or cupric ion in the plating bath substantially constant.

A species of the above-mentioned method for producing a metal film resistor further comprises, a step of depositing a metal undercoat which serves as a foundation for the copper-nickel alloy on the insulating substrate by electroless plating, besides the above-mentioned steps, prior to the step of depositing copper-nickel alloy.

In another species of the present invention, the method for producing a metal film resistor further comprises, prior to the step of depositing copper-nickel alloy, steps of subjecting the insulating substrate to an activation treatment and depositing a nickel undercoat which serves as a foundation for the copper-nickel alloy on the insulating substrate by electroless plating.

The above-mentioned method for producing a metal film resistor may further comprises a step of subjecting the deposited copper-nickel alloy to a heat-treatment under a nitrogen atmosphere at a temperature of 500° C. or above.

While the novel features of the present invention are set forth particularly in the appended claims, the invention, both as to organization and content, will be better understood and appreciated, along with other objects and features thereof, from the following detailed description taken in conjunction with the attached drawings.

BRIEF DESCRIPTION OF THE DRAWINGS

FIG. 3 is a diagram showing the relationship between the heat-treatment temperature of the plated film and the TCR of the resistor obtained in the plating bath of various pH values.

DETAILED DESCRIPTION OF THE PREFERRED EMBODIMENTS

Plating Bath Composition

Figure 1:
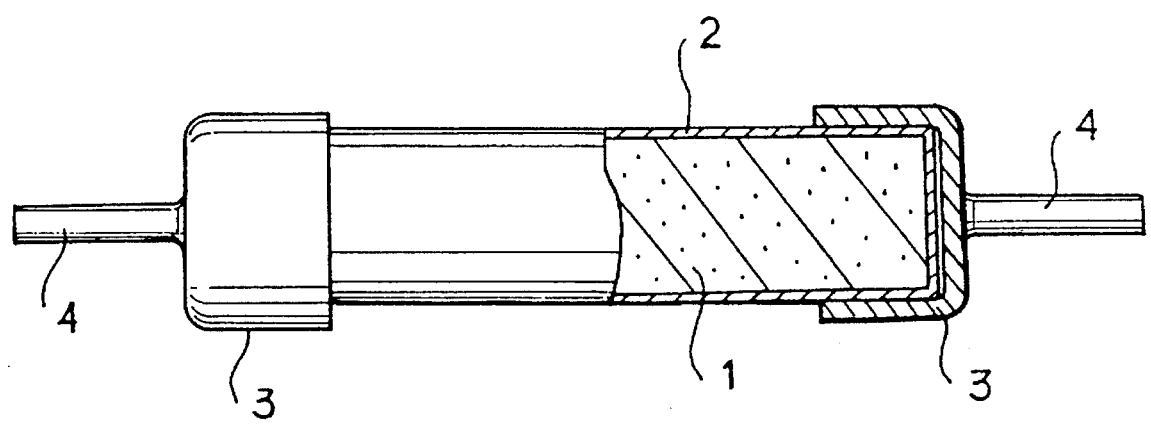
FIG. 1 is a front view with a part cross-section showing a schematic configuration of the metal film resistor built in accordance with an embodiment of the present invention.

The above-mentioned pyrophosphate bath enables one to perform a thick deposition of the copper-nickel alloy film and facilitates an acquisition of a resistor in a low resistance region. Further, by adequately selecting the plating conditions, it is possible to obtain an alloy film having an excellent physical property. Moreover, the plating process has a high current efficiency and is excellent in the stability of the bath composition. In addition, the plating process facilitates effluent water treatment.

pH Value of the Plating Bath

The pH value of the plating bath largely influences the nickel content in the resultant plated film and its film thickness. When the pH value of the bath rises, the nickel content in the plated film, as well as its film thickness, increases. It is believed that the reason why the nickel content decreases with the decrease of the pH value is that the stability of cupric or cuprous ions in the plating bath is influenced by the pH value, thus rendering coordination of pyrophosphoric acid as a complexing agent to nickel in the bath difficult in a low pH region.

In addition, an increase in the film thickness attributable to a hydroxide formation of nickel is observed in a high pH region, and also a decrease in the current efficiency and a decrease in an adhesive property of the plated film to the substrate attributable to the generation of hydrogen during plating are observed in a low pH region.

In more detail, the alloy film deposited from a bath at pH 6 is found to have a surface having a number of cracks when observed on scanning electron microscopy (SEM) micrographs, and there is coexistence of nickel oxide and metal nickel in the plated film on electron spectroscopy for chemical analysis (ESCA). In contrast to this, there is an evidence of coexistence of nickel hydroxide and metal nickel in the film deposited from a bath at pH 9. When these films are heat-treated under a hydrogen atmosphere at 600°–800° C., oxygen in the films substantially disappears and the temperature coefficient of resistance of the film decreases.

On the other hand, in the film deposited from a bath at pH 7 or pH 8, there is no evidence of nickel oxide and nickel hydroxide existences as mentioned in the above on ESCA, and a waveform which approximates to a peak of metal nickel is observed. Thus, the film deposited from the bath at pH 7–8 has a high quality. The film deposited from the bath at pH 7 has a nickel content of about 50 wt % and demonstrates the least value of the temperature coefficient of resistance. Namely, the film deposited from the bath at pH 7 demonstrates a fairly good temperature coefficient of resistance of $\pm 200$ ppm/°C. or smaller without subjecting it to any heat-treatment, and the temperature coefficient of resistance becomes $\pm 50$ ppm/°C. or smaller by a heat-treatment at 500° C., and it becomes substantially 0 by a heat-treatment at 600° C.

Heat-treatment

The atmosphere under which the plated film is subjected to the heat-treatment may be any of hydrogen or an inert gas, but nitrogen is obviously the most economical for performing the heat-treatment. The time period for the heat-treatment may be about 25 minutes at 500° C. The temperature at which the heat-treatment is performed is preferably in a range from 500° C. to 600° C. If the temperature exceeds 600° C., there is a danger of sticking of the metal film resistors together or of expansion or inflation of the metal film.

Composition of Metal Film

As above-mentioned, although the nickel content in the resultant plated film is influenced by the pH value of the plating bath, the nickel content increases also with the progress of the plating step. The nickel content in the plated film is preferably in a range from 35 wt % to 60 wt %. In order to make the nickel content constant, it is advantageous to employ a nickel plate and a separate copper plate as soluble anodes and to distribute the total amount of plating current into the nickel anode current and into the copper anode current at a constant ratio, thereby to make nickel/copper concentration ratio in the plating bath substantially equal to the constant ratio. In this case, since copper is liable to be deposited more than nickel, it is preferable to make the copper concentration smaller than that of nickel in the plating bath. It is also preferable to make the ratio for distributing the plating current between the nickel anode and the copper anode to correspond to the molar ratio of nickel/copper in the plating bath, as will be described in more detail in the below-mentioned examples.

In the above-mentioned method, preferable plating conditions are:

| Current density | 0.1–10 A/dm$^2$ (in the case of barrel plating) 0.1–100 A/dm$^2$ (in the case of sheet plating) |
| --- | --- |

When depositing a copper-nickel alloy film on a sheet-like substrate, a plating process can be performed at a high current density, by separating the substrate plate from the anode with a clearance of 20 mm or smaller, and by circulating the bath solution at a flow rate of about 4 m/sec. In this case, the current density can be made to 0.1–100 A/dm$^2$.

The copper-nickel alloy film deposited by the electroplating from the pyrophosphate bath in accordance with the present invention has a copper content of 45 wt %– 60 wt %, and the copper and nickel in the plated film are in an alloy phase immediately after they are deposited. Therefore, the method of the present invention can provide a copper-nickel alloy film having a temperature coefficient of resistance of±200 ppm/°C. or smaller without any heat-treatment and that of±50 ppm/°C. or smaller with a heat-treatment at 500°–600° C.

Furthermore, in the case of employing an insulating substrate of a size described in the below-mentioned examples, it is possible to provide a resistor of a low resistance region as small as 10 mΩ and to provide a resistor in a high resistance region as large as 10 Ω.

As is clear from the following description, according to the present invention, it is possible to provide a metal film resistor of resistance in a wide range of from high resistance to low resistance and is also excellent in the temperature coefficient of resistance, without subjecting the plated film to any heat-treatment or with a heat-treatment at a lower temperature than that used in the prior art.

The following examples and comparative examples are given for the purpose of further illustrating the present invention with reference to the attached drawings, but are in no way to be taken as limiting.

EXAMPLE 1

Pretreatment

Samples of a cylindrical porcelain insulator of 1W-resistor type having a diameter of 3 mm and a length of 11 mm were subjected to a pretreatment, i.e., an etching, an activation treatment and an electroless plating of nickel-phosphor alloy as a foundation for the copper-nickel alloy under the below-mentioned conditions.

| (1) Etching: | |
|---|---|
| Hydrofluoric acid | 150 cc/L |
| Nitric acid | 50 cc/L |
| Temperature | Room temperature |
| Time period | 2 minutes |
| (2) Activation treatment: | |
| i) Sensitization: | |
| SnCl$_2$ | 10 g/L |
| Hydrochloric acid | 40 cc/L |
| Temperature | Room temperature |
| Time period | 2 minutes |
| ii) Activation: | |
| PdCl$_2$ | 0.25 g/L |
| Hydrochloric acid | 2.5 cc/L |
| Temperature | Room temperature |
| Time period | 2 minutes |

The above-mentioned sensitization and activation were repeated twice.

| (3) Foundation plating (or substrate plating): | |
|---|---|
| NiSO$_4$.6H$_2$O | 30 g/L |
| NaH$_2$PO$_2$.H$_2$O | 10 g/L |
| Sodium citrate (Na$_3$C$_6$H$_5$O$_7$.2H$_2$O) | 10 g/L |
| Temperature | 85° C. |
| Time period | 5 minutes |

Plating

A thousand (1000) pieces of the samples which had been subjected to the above-mentioned pretreatment were placed in a barrel and electrolytically plated with copper-nickel alloy films in a plating bath containing 5 liters of the below-mentioned plating bath composition. The conditions are: a bath temperature of 30° C., a rotation of the barrel of 8 rpm, an anode of platinum-plated titanium and a plating current of 3 A for 8 hours.

| Composition of the plating bath: | |
|---|---|
| CuSO$_4$.5H$_2$O | 0.01 mole/L |
| NiSO$_4$.6H$_2$O | 0.09 mole/L |
| K$_4$P$_2$O$_7$ | 0.30 mole/L |
| pH | 6–9 |

Adjustment of the pH of the plating bath was performed with an addition of potassium hydroxide for higher pH value, and with an addition of sulfuric acid for lower pH value.

Sample Groups

After depositing a copper-nickel alloy film on each piece of the samples by the above-mentioned plating step, the samples were divided into the following five groups of metal film resistors and their characteristics were examined:

(1) Resistors without a heat-treatment (2) Resistors with a heat-treatment under a mixed gas atmosphere of hydrogen and nitrogen of a volumetric ratio of 1 : 9 at 200° C. for 25 minutes;

(3) Resistors with a heat-treatment under the same conditions as (2) except for the temperature at 400° C.;

(4) Resistors with a heat-treatment under the same conditions as (2) except for the temperature at 600° C.; and (5) Resistors with a heat-treatment under the same conditions as (2) except for the temperature at 800° C.

Structure of Metal Film Resistor

FIG. 1 shows a configuration of the metal film resistor obtained in the above-mentioned manner. In FIG. 1, the surface of the above-mentioned cylindrical porcelain insulator 1 is coated with a layer 2 composed of a nickel film deposited by electroless plating and a copper-nickel alloy film deposited on the nickel film. A pair of cap terminals 3 made of iron plated with copper in a thickness of about 1 μm and with solder in a thickness of about 2 μm are press-fitted on both ends of the cylindrical porcelain insulator 1. And, a pair of lead wires 4 are connected to the cap terminals 3 by soldering.

Figure 2:
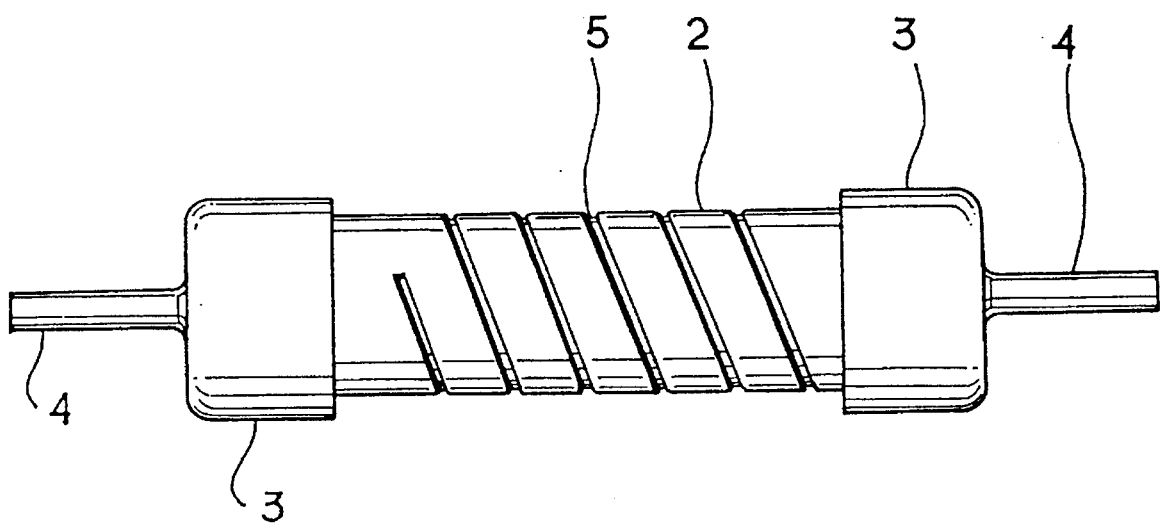
FIG. 2 is a front view showing a schematic configuration of the metal film resistor for measuring temperature coefficient of resistance built in accordance with the embodiment of the present invention.

FIG. 2 shows a sample resistor for measurement of temperature coefficient of resistance (hereinafter referred to as "TCR") whose resistor film 2 is worked to have a groove 5 for increasing its resistance to about 5 Ω. The TCR values in the following description were derived based on the resistance values at 25° C. and 125° C.

Figure 4:
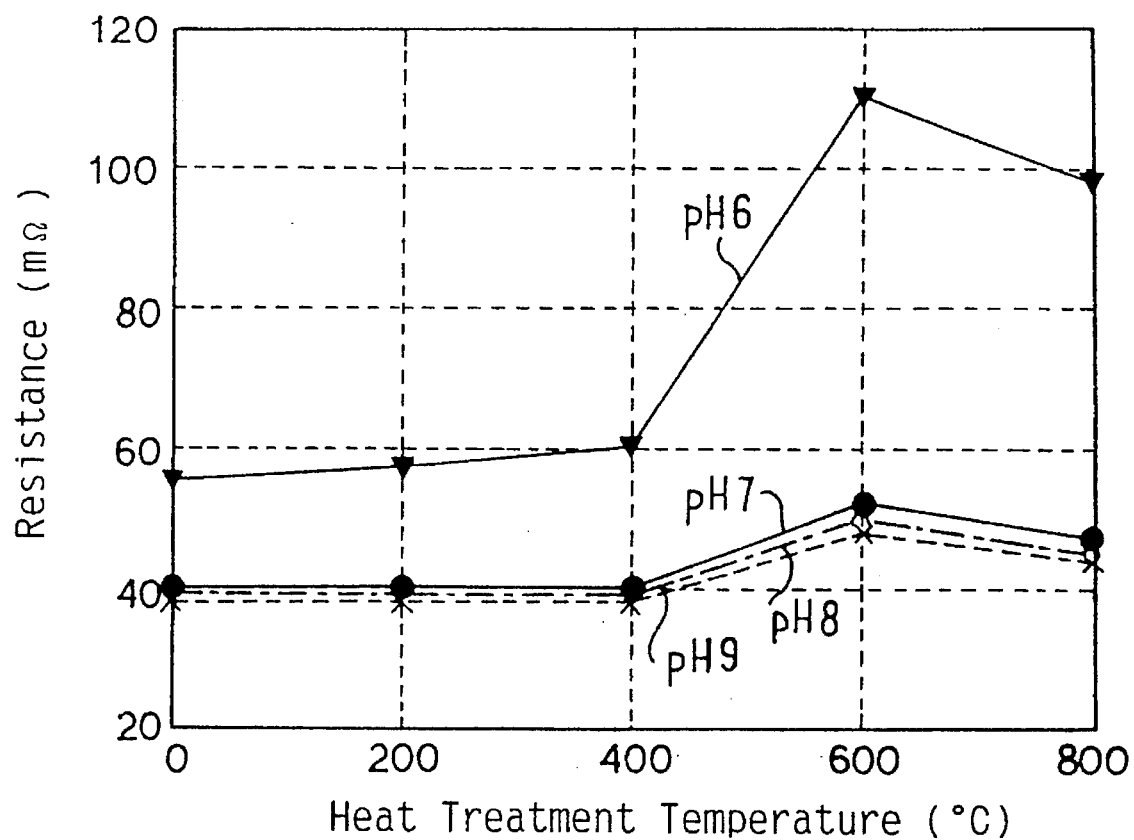
FIG. 4 is a diagram showing the relationship between the heat-treatment temperature of the plated film and the resistance of the resistor obtained in the plating bath of various pH values.

FIG. 3 is a diagram showing the relationship between the heat-treatment temperature of the plated film and the TCR of the resistor obtained in the above-mentioned plating baths of various pH values. FIG. 4 is a diagram showing the relationship between the heat-treatment temperature of the plated film and the resistance of the resistor obtained in the above-mentioned plating baths of various pH values.

As clearly shown by FIG. 3, it is possible to obtain a characteristic of TCR≦±100 ppm/°C. by selecting the pH value of the plating bath of 6–8, and the heat-treatment temperature of the plated film of about 600° C. Particularly, if the pH value of the plating bath is adjusted to 7, a characteristic of TCR≦±10 ppm/°C. can be obtained at the heat-treatment temperature of 600° C. or above.

The resistors obtained with a plating bath of the pH value of 6–8 are excellent in the temperature coefficient of resistance. As shown by FIG. 4, with respect to the resistances of the resistors obtained under these conditions, those obtained with the plating bath of pH 7–9 only slightly change, whereas those obtained with the plating bath of pH 6 greatly change at the heat-treatment temperature of 600° C. or above. From these experimental results, it is concluded that one of the conditions for obtaining an excellent temperature coefficient of resistance and a low resistance value is the value of pH 7–8 of the plating bath.

COMPARATIVE EXAMPLE

Alternate Plating

A thousand (1000) pieces of the samples which had been subjected to a pretreatment similar to those in Example 1, composed of the etching, the activation treatment and the foundation plating, were placed in barrels of 8 rpm containing 5 liters of the below-mentioned plating bath compositions. The copper plating and the nickel plating were alternately made four times under the following conditions.

| (1) Copper Plating: Plating bath composition: | |
|---|---|
| CuCN | 50 g/L |
| NaCN | 10 g/L |
| pH | 12.5 |
| Bath temperature | 60° C. |
| Anode | Copper plate |
| Plating current | 2 A |
| Time period | 30 minutes |
| (2) Nickel Plating: Plating bath composition: | |
| CuSO$_4$.5H$_2$O | 280 g/L |
| NiCl$_2$ | 50 g/L |
| pH | 4 |
| Bath temperature | 50° C. |
| Anode | Nickel plate |
| Plating current | 2 A |
| Time period | 40 minutes |

Sample Groups

After alternately depositing copper films and nickel films on each piece of the samples by the above-mentioned plating step, the samples were divided into the following five groups of metal film resistors and their characteristics were examined:

(1) Resistors without a heat-treatment (2) Resistors with a heat-treatment under an atmosphere of a mixed gas of hydrogen and nitrogen of a volumetric ratio of 1 : 9 at 200° C. for 25 minutes (3) Resistors with a heat-treatment under the same conditions as (2) except for the temperature at 400° C.

(4) Resistors with a heat-treatment under the same conditions as (2) except for the temperature at 600° C.

(5) Resistors with a heat-treatment under the same conditions as (2) except for the temperature at 800° C.

Comparison of Characteristics

Figure 5:
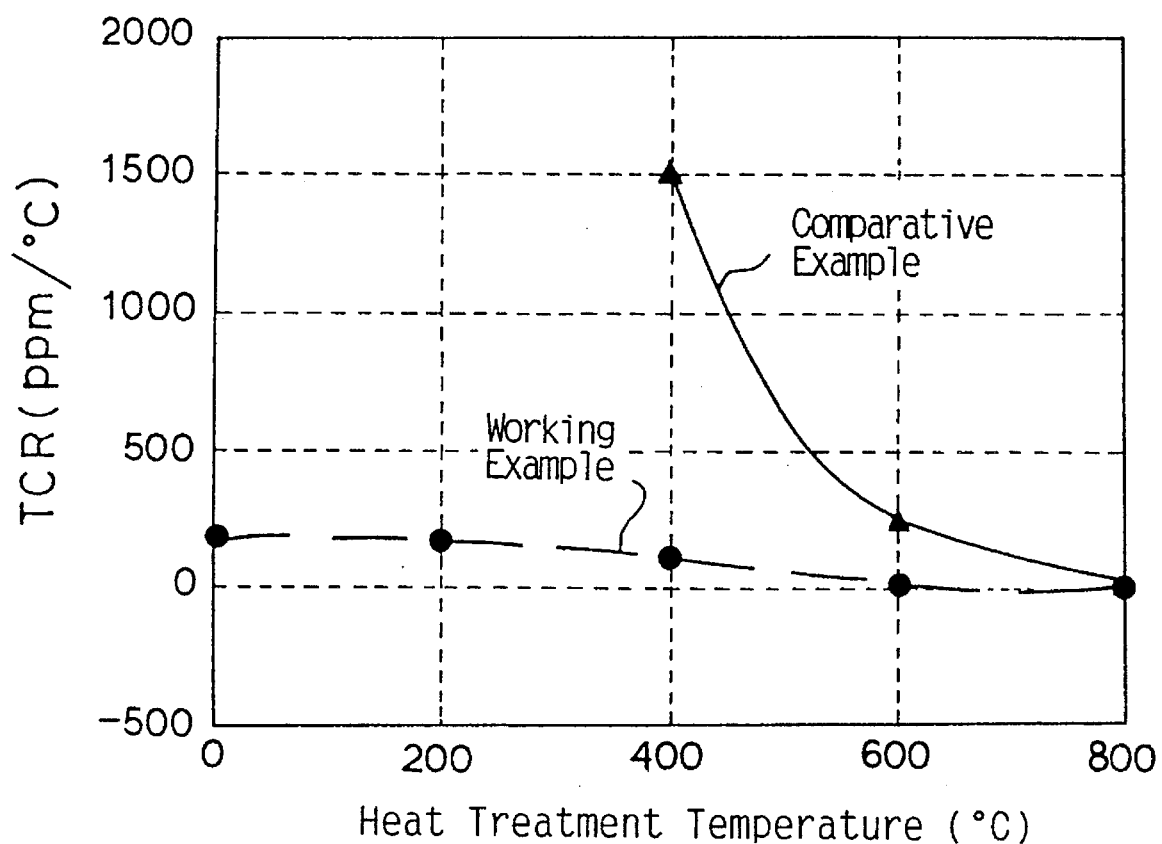
FIG. 5 is a diagram showing the relationship between the heat-treatment temperature of the plated film and the TCR of the resistor of the working example of the present invention or of the comparative example.
Figure 6:
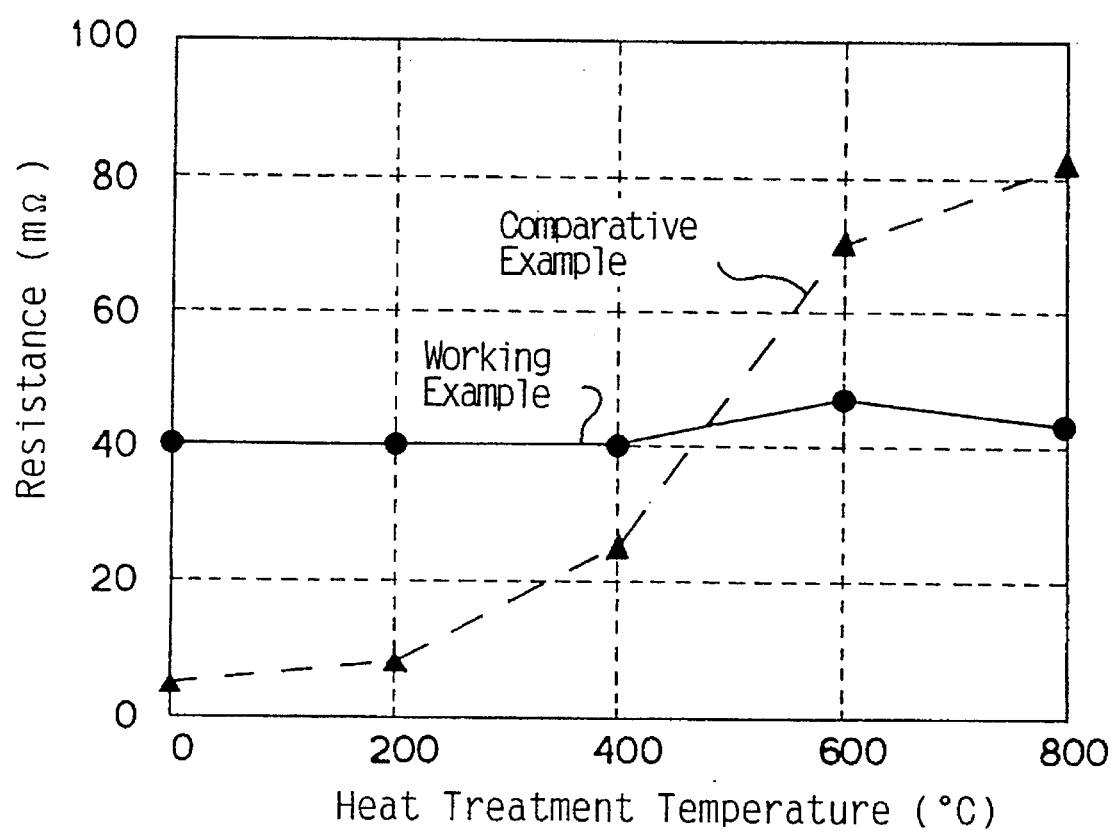
FIG. 6 is a diagram showing the relationship between the heat-treatment temperature of the plated film and the resistance of the resistor of the working example or the comparative example.

FIG. 5 is a diagram showing the relationship between the heat-treatment temperature of the plated film and the TCR of the resistor of the working example of the present invention (those obtained in Example 1, wherein the pH of the plating bath was selected to be 7) and the resistor of Comparative Example. FIG. 6 is a diagram showing the relationship between the heat-treatment temperature of the plated film and the resistance of the resistors of Example 1 and Comparative Example.

As clearly shown by these diagrams, although it is possible to obtain a characteristic of TCR=±200 ppm/°C. or smaller in accordance with the present invention, the same or similar characteristics can only be obtained with the heat-treatment temperature of the plated film as high as 800° C. by the Comparative Example. In addition, the resistance value of the resistor obtained by the Comparative Example increases by the heat-treatment at a high temperature, if it is forced to decrease the TCR.

EXAMPLE 2

Copper-nickel alloy films were deposited on the porcelain insulators under the same conditions as in Example 1 except for the pH value of the plating bath which was fixed at 7 and the plating current which was adjusted to 2–4 A. These alloy films were heat-treated under the same mixed gas atmosphere as that in Example 1 and at 800° C. for 25 minutes to obtain resistors.

Figure 7:
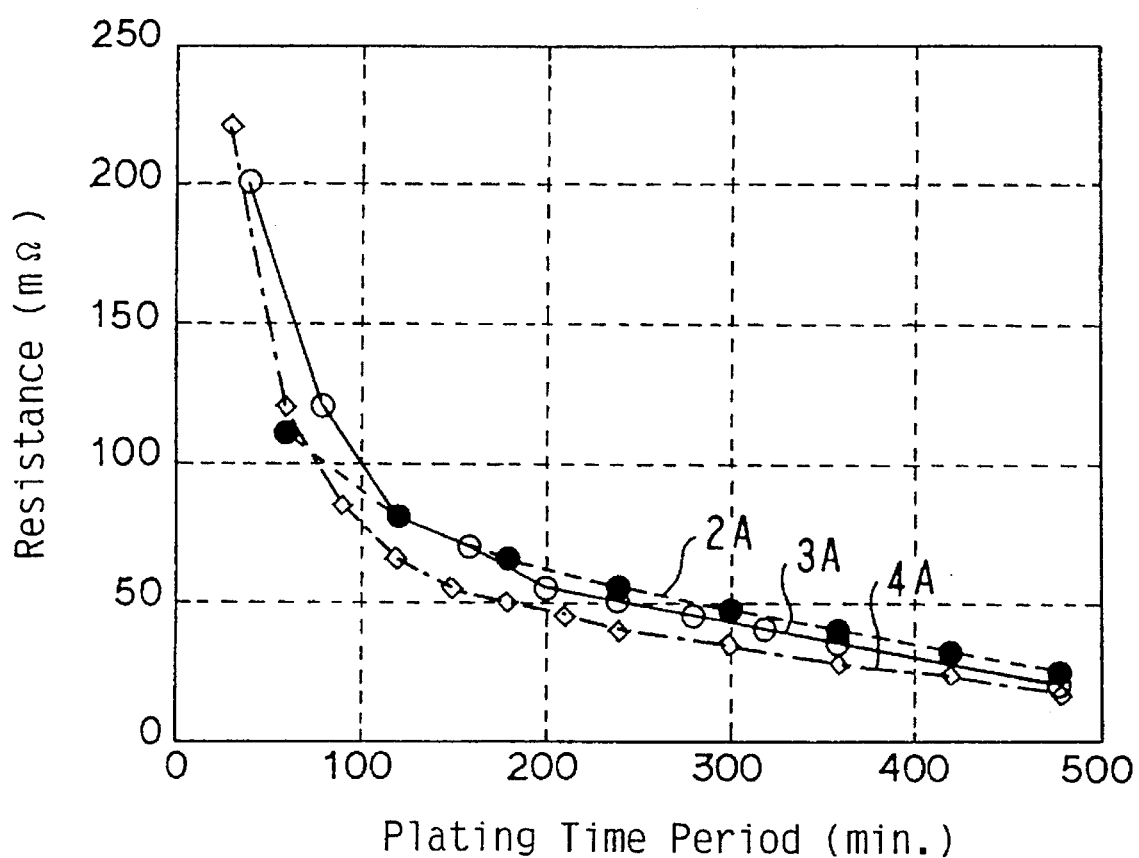
FIG. 7 is a diagram showing the relationship between the plating time period at various plating current and the resistance value of the obtained resistor.
Figure 8:
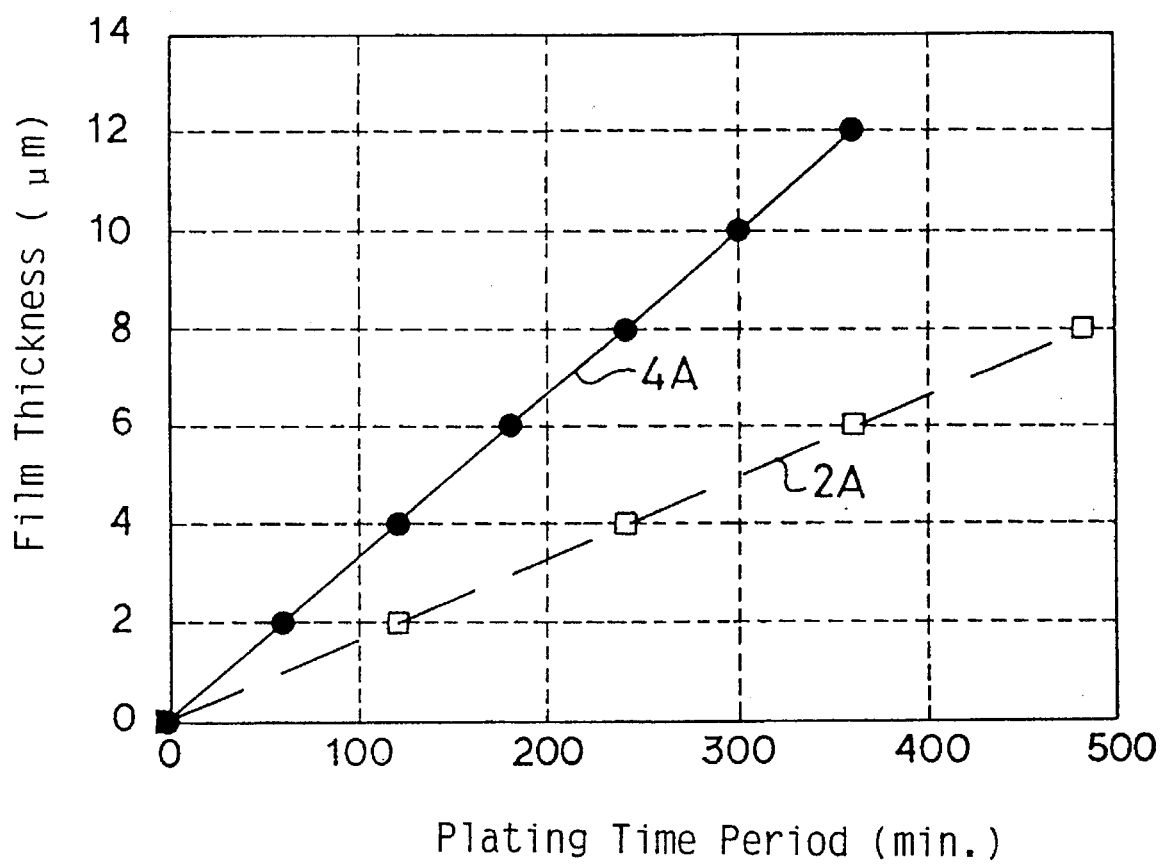
FIG. 8 is a diagram showing the relationship between the plating time period at various plating current and the film thickness of the obtained plated film.

FIG. 7 is a diagram showing the relationship between the plating time period at various plating currents and the resistance value of the obtained resistor. FIG. 8 is a diagram showing the relationship between the plating time period at various plating currents and the film thickness of the resultant plated film. As apparent from these diagrams, it is possible to obtain a low resistance value by prolonging the plating time period or enlarging the plating current value, thereby to increase the thickness of the plated film.

EXAMPLE 3

Figure 9:
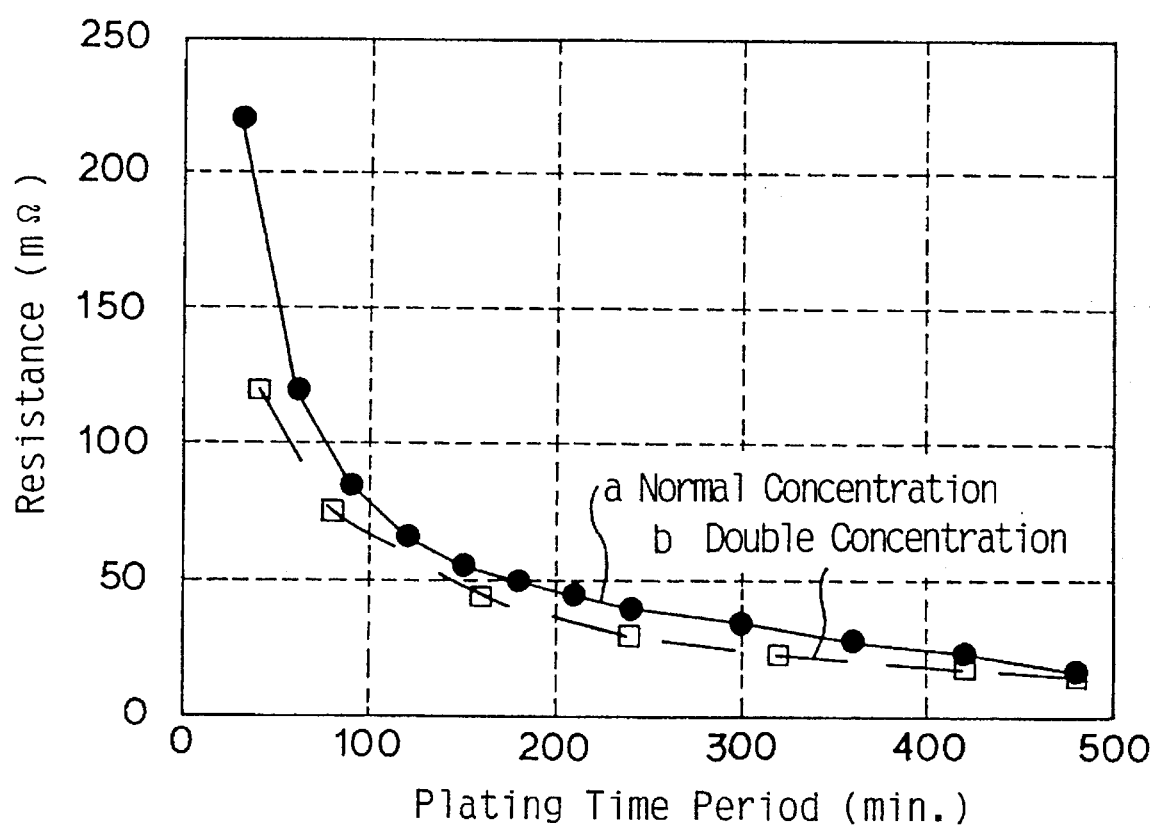
FIG. 9 is a diagram showing the relationship between the plating time period and the resistance value of the obtained resistor.

The same procedures as in Example 1 were followed except for the change in the metal concentration of the plating bath. FIG. 9 is a diagram showing the relationship between the plating time period in the plating baths having various metal concentrations and the resistance value of the obtained resistor. In FIG. 9, the curve indicated by "a" represents the resistance value of the resistor obtained under the same conditions as in Example 1 except for the pH value of the plating bath fixed at 7, the plating current value fixed at 4 A and the heat-treatment under the same conditions as in Example 1. On the other hand, the curve indicated by "b" represents the resistance value of the resistor obtained with a plating bath containing the nickel salt and the copper salt of concentration as twice high as that of the case of "a".

EXAMPLE 4

Copper-nickel alloy films were deposited on the porcelain insulators under the same conditions as in Example 2 except for the plating current fixed at 2.5 A. These alloy films were heat-treated under the same conditions as those in Example 2.

Figure 10:
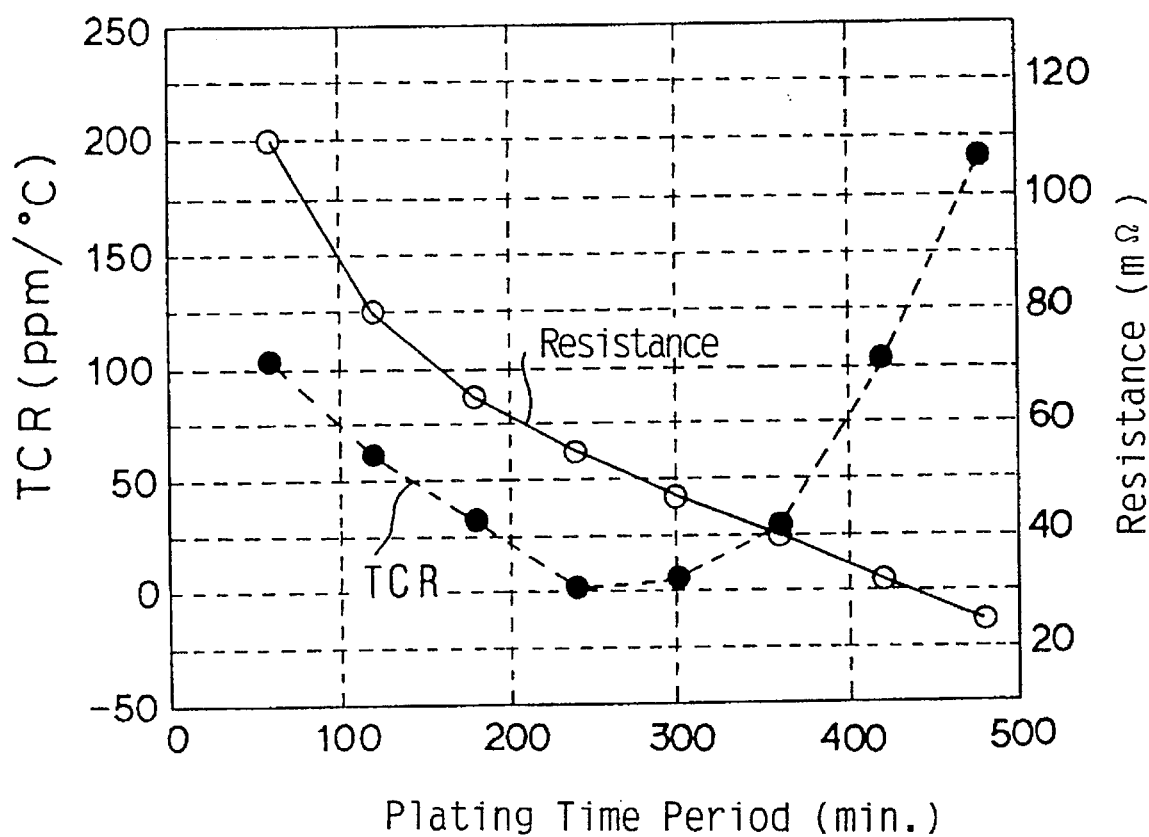
FIG. 10 is a diagram showing the relationship between the plating time period and the TCR or the resistance value of the obtained resistor.
Figure 11:
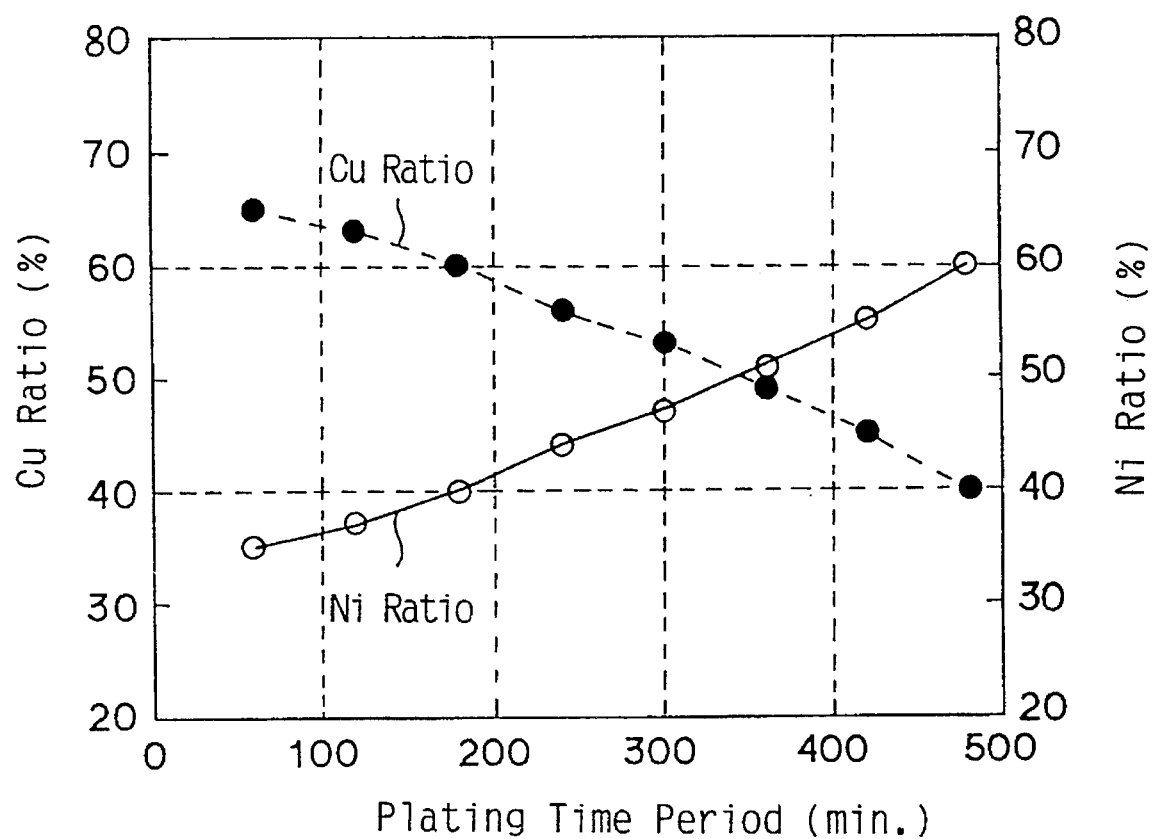
FIG. 11 is a diagram showing the relationship between the plating time period and the copper or nickel ratio in the obtained copper-nickel alloy plated film.

FIG. 10 is a diagram showing the relationship between the plating time period and the TCR or the resistance value of the obtained resistor. FIG. 11 is a diagram showing the relationship between the plating time period and the copper ratio or the nickel ratio in the obtained copper-nickel alloy film. In this case, the nickel component included in the foundation film is subtracted from the total nickel components in calculating the copper/nickel ratio (hereinafter, the same procedures are followed). From these diagrams, it is appreciated that resistors having the temperature coefficient of resistance of±100 ppm/°C. are obtained in a copper ratio ranging from 45 wt % to 65 wt % in the copper-nickel alloy films.

Figure 12:
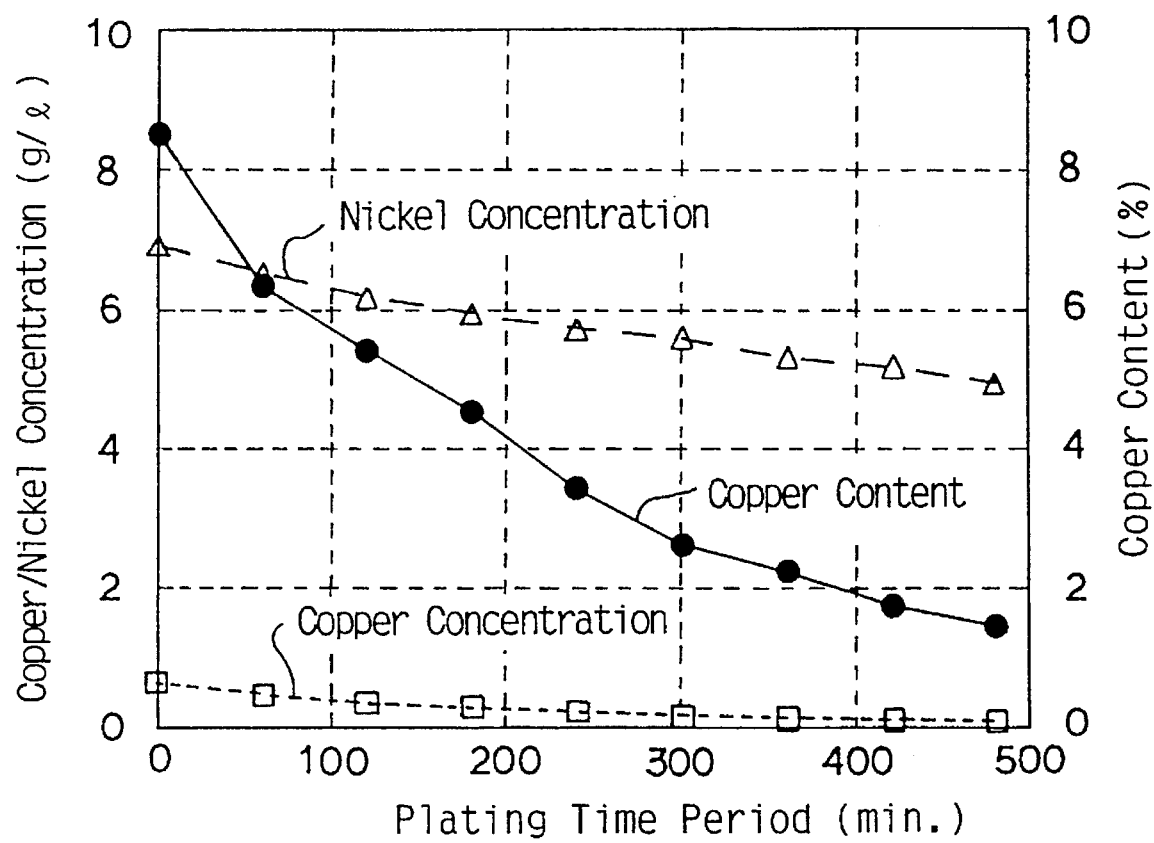
FIG. 12 is a diagram showing the relationship between the plating time period and the Cu and Ni concentrations in the bath or the Cu content in the deposited film.

FIG. 12 is a diagram showing the relationship between the plating time period and the Cu and Ni concentrations in the bath or the Cu content in the deposited film.

From FIG. 12, it is appreciated that at the initial stage of the plating step, a plated film having a high copper content is obtained but the copper content in the plated film decreases with the progress of the plating step, because the copper (cupric or cuprous) ion concentration gradually decreases with the progress.

EXAMPLE 5

Copper-nickel alloy films were deposited on the porcelain insulators under the same conditions as in Example 1 except for the pH value which was fixed at 7 and subsequent being heat-treated under the mixed gas atmosphere of hydrogen-nitrogen or the single phase nitrogen atmosphere as in Example 1 for 25 minutes.

Figure 13:
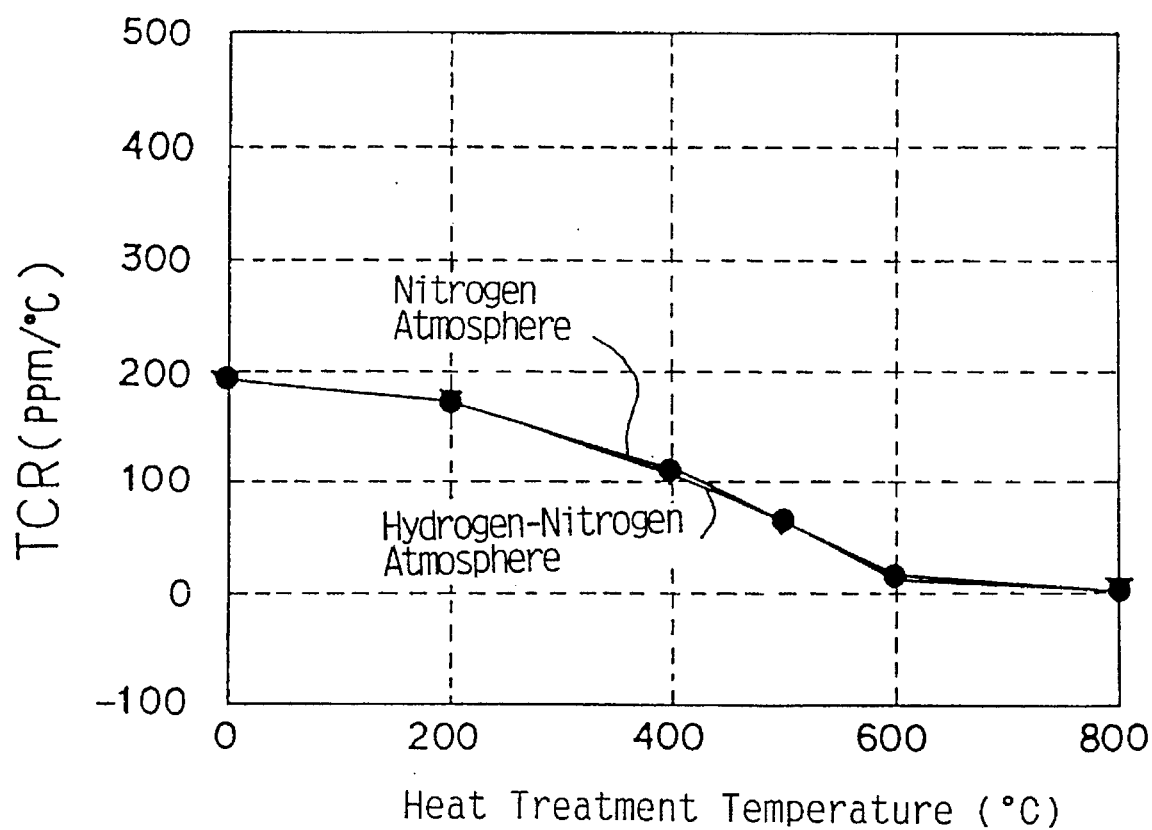
FIG. 13 is a diagram showing the relationship between the heat-treatment temperature and the TCR of the resistor obtained by heat-treated under nitrogen atmosphere or hydrogen-nitrogen atmosphere.

FIG. 13 is a diagram showing the relationship between the heat-treatment temperature and the TCR of the obtained resistor. From FIG. 13, it is appreciated that the resistors of the similar characteristics are obtained with either heat-treatment atmosphere of single phase nitrogen or nitrogen containing hydrogen atmosphere. Furthermore, it is found that the resistors having the TCR of±50 ppm/°C. or smaller are obtained by selecting the heat-treatment temperature of 500° C. or above.

EXAMPLE 6

In the foregoing examples, the metal concentration in the plating bath varies with the progress of the plating step, because the plating bath is not supplied with copper or nickel component. Thus, the copper/nickel ratio in the resultant plated film varies and making of the resistor with such a metal film has a disadvantage that their TCR is not stabilized.

In this Example, the anode of titanium plate plated with platinum was replaced with a separate nickel plate and a copper plate for overcoming this disadvantage and for making the metal concentration of the plating bath constant.

During the plating step, the total plating current value of 3 A was divided into 2.7 A and 0.3 A, and distributed between the nickel plate and the copper plate to flow therethrough, respectively. The ratio of the plating current value in this distribution corresponded to the molar ratio of nickel and copper in the plating bath. Except for the distribution of the plating current, the same procedure as that in Example 2 was followed for depositing the copper-nickel alloy film and for heat-treating the deposited film under the same conditions as those in Example 2.

Figure 14:
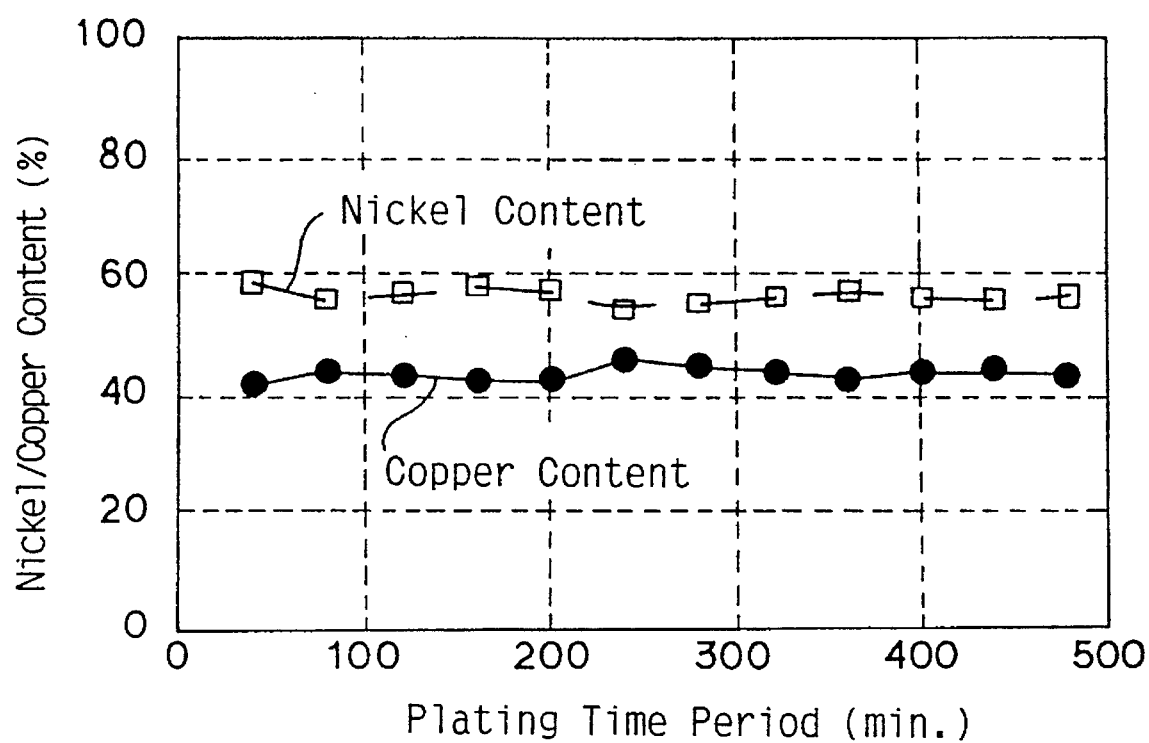
FIG. 14 is a diagram showing the relationship between the plating time period and the nickel/copper content ratio in the obtained plated film.
Figure 15:
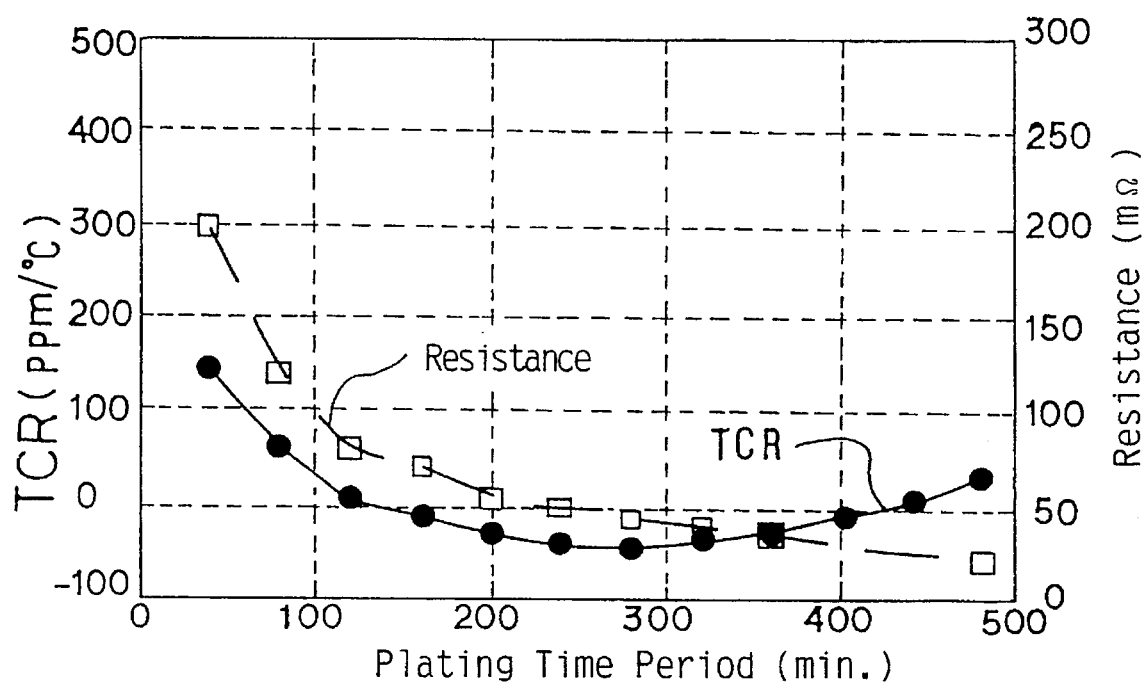
FIG. 15 is a diagram showing the relationship between the plating time period and the TCR or the resistance value of the obtained resistor.

FIG. 14 is a diagram showing the relationship between the plating time period and the nickel/copper content ratio in the obtained plated film. FIG. 15 is a diagram showing the relationship between the plating time period and the TCR or the resistance value of the obtained resistor.

From these diagrams, it is appreciated that the nickel/copper content ratios in the resultant plated films are made substantially constant, i.e., at the value of about 55 : 45, and that the TCRs of the obtained resistors are made about±50 ppm/°C. or below except for the initial stage of the plating step, by employing the separate nickel and copper anodes.

In the foregoing description on the embodiments, only cylindrical resistors are illustrated. Although not illustrated in FIG. 1 and FIG. 2, it is preferable to coat at least the metal film and usually the pair of cap terminals with a protective film of a resin such as epoxy resin for preventing a possible oxidation of the metal film.

It is needless to say that the present invention can also be applied to any other resistors having the metal film as their resistor film such as rectangular tip resistors. In the following description, an example applied to the rectangular tip resistor will be illustrated.

EXAMPLE 7

Preliminary Treatment

Samples of a rectangular substrate plate (64 mm ×50 mm with a thickness of 0.6 mm) made of alumina ($Al_2O_3$: 96%, $SiO_2$: 4%) were subjected to a pretreatment, i.e., an etching, an activation treatment and an electroless plating of nickel-phosphor alloy as a foundation plating under the below-mentioned conditions. The substrate plate had slits for dividing it into the longitudinal and lateral directions in order to produce a plurality of tips at the same time.

| (1) Etching: | |
|---|---|
| Hydrofluoric acid | 20 cc/L |
| Nitric acid | 20 cc/L |
| Temperature | Room temperature |
| Time period | 5 minutes |

(2) Activation treatment: Identical with that of Example 1.
(3) Foundation plating: Identical with that of Example 1.

The sample which had been subjected to the above-mentioned pretreatment was electrolytically plated with a copper-nickel alloy film in a plating bath having the below-mentioned composition, under the conditions of a bath temperature of 40° C. and a current density of 1 A/dm$^2$ for one hour. In this plating step, the sample was separated from an anode of platinum-plated titanium with a clearance of 4 mm, and a plating bath solution was circulated through the clearance with a liquid flow rate of 4 m/sec. The amount of the plating bath solution was 20 liters.

| Composition of the plating bath: | |
|---|---|
| $CuSO_4.5H_2O$ | 0.01 mole/L |
| $NiSO_4.6H_2O$ | 0.09 mole/L |
| $K_4P_2O_7$ | 0.30 mole/L |
| pH | 8–9 |

After depositing a copper-nickel alloy film on the substrate plate by the above-mentioned plating step, it was subjected to a heat-treatment under a mixed gas atmosphere of hydrogen and nitrogen of a volumetric ratio of 1 : 9 at 800° C. for 25 minutes. Then, the film thus obtained was trimmed in the known manner by a laser radiation to have a target resistance value. Thereafter, the specified portions (in the shape of lateral strips) of the plated film were coated with a paste of an epoxy resin having humidity-resistive and heat-resistive properties by screen printing. And the resin was cured by heating it in the air at 200° C. for 30 minutes.

The plated and protection resin-coated substrate was then divided along the lateral slits into a plurality of oblong strips. Each of the divided oblong strips contains the protection epoxy resin. Thereafter, the lateral divided sides and oblong parts of the plated film which were touching with the lateral divided sides of the obtained strips and further, oblong side parts of the opposite face to the principal face were coated with a pair of oblong conductive film of a conductive paste made with a resin-silver powder mixture by a roller applicator, and the coated paste films were cured by heating them in the air at 200° C. for 30 minutes.

Next, the oblong strip was divided into the rectangular individual tips by separating it along the above-mentioned longitudinal slits. In order to ensure a reliability at soldering, an electrolytic nickel plating film (thickness: about 5 μm), and thereover a solder plating film (thickness: about 5 μm) were formed on the surfaces of the cured conductive films of the individual tips to complete a rectangular metal film resistor.

Figure 16:
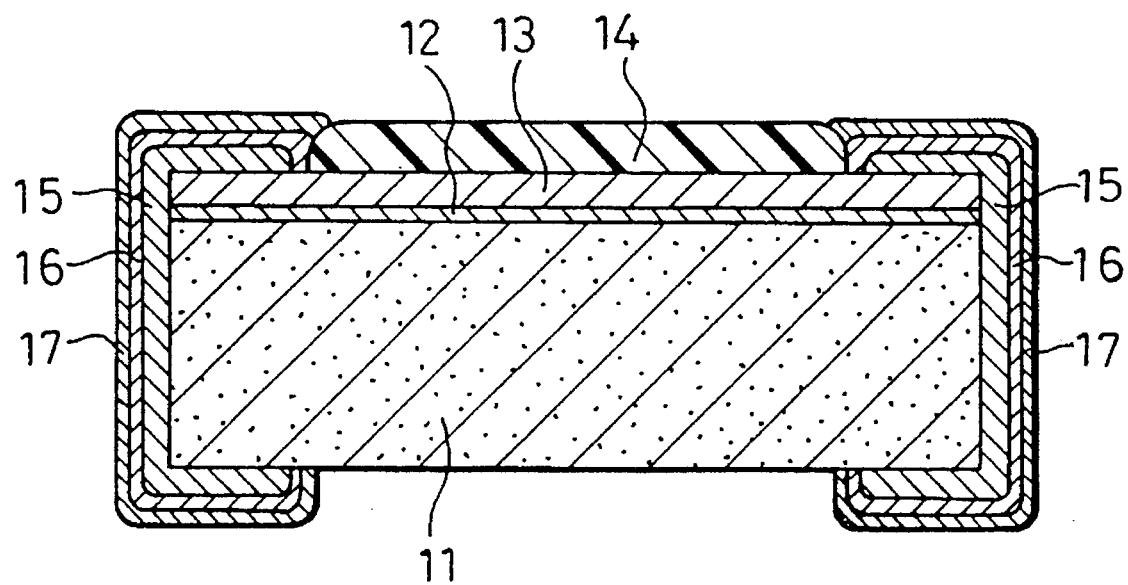
FIG. 16 is a cross-sectional side view of a metal film resistor produced in accordance with another embodiment of the present invention.

FIG. 16 is a cross-sectional side view of the resistor produced in the above-mentioned manner.

As shown by FIG. 16, an alumina substrate plate 11 has an undercoat of nickel-phosphor alloy film 12 which serves as a foundation and a copper-nickel alloy film 13 on its principal surface. The specified portions (in the shape of lateral strips) of the plated film 13 are covered with the protective film 14 of the cured epoxy resin which serves for preventing the possible oxidation of the plated film 13. After the formation of the protective film 14, the substrate plate 11 is divided into a plurality of oblong strips along the vertical planes which are perpendicular to the face of the paper of FIG. 16 and on respective above-mentioned lateral slits. Thereafter, the lateral divided sides and oblong parts of the plated film which are touching with the lateral divided sides of the obtained strips and further, oblong side parts of the opposite face to the principal face are coated with a pair of oblong cured conductive films 15. Then each oblong strip of substrate plate 11 is cut into a plurality of the individual tips along the vertical planes which are parallel to the paper of FIG. 16 and the plated nickel film 16 and plated solder film 17 are formed to complete the resistors.

The resistance of each tip resistor (a size of the substrate plate is 4.5×3.2 mm) obtained in the above-mentioned manner can be adjusted to have a resistance value in a range of from about 10 mΩ to about 400 mΩ by adjusting the thickness of the copper-nickel alloy film, and its TCR is±30 ppm/°C.

Although the present invention has been described in terms of the presently preferred embodiments, it is to be understood that such disclosures are not to be interpreted as limiting. Various alterations and modification will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing a metal film resistor including at least an insulating substrate having a surface, a resistor film of copper-nickel alloy formed on said surface of said insulating substrate, and a pair of terminals which are in contact with said resistor film, said method comprising:

a step of electrolyzing an aqueous pyrophosphate bath containing 0.005–0.030 mole/L of cupric sulfate, 0.07–0.30 mole/L of nickel sulfate and 0.20–0.50 mole/L of potassium pyrophosphate at a bath temperature of 20°–40° C. and a pH of 6– 8 to deposit copper-nickel alloy with a copper ratio of from 40 to 65 wt %.

2. The method for producing a metal film resistor in accordance with claim 1, which further comprises, prior to said step of depositing copper-nickel alloy, a step of depositing a metal undercoat which serves as a foundation for said copper-nickel alloy on said insulating substrate by electroless plating.

3. The method for producing a metal film resistor in accordance with claim 1, which further comprises, prior to said step of depositing copper-nickel alloy, steps of subjecting said insulating substrate to an activation treatment and depositing a nickel undercoat which serves as a foundation for said copper-nickel alloy on said insulating substrate by electroless plating.

4. The method for producing a metal film resistor in accordance with claim 1, wherein said step of depositing copper-nickel alloy is performed by electrolyzing said pyrophosphate bath by using separate anodes of copper and nickel and a plating current is distributed between the copper anode and the nickel anode in a constant proportion, thereby to make a concentration ratio of nickel ion to copper ion in said pyrophosphate bath substantially constant.

5. The method for producing a metal film resistor in accordance with claim 1, further comprising a step of subjecting said copper-nickel alloy to a heat-treatment under a nitrogen atmosphere at a temperature of 500° C. or above.

6. A method for producing a metal film resistor including at least an insulating substrate having a surface, a resistor film of copper-nickel alloy formed on said surface of said insulating substrate, and a pair of terminals which are in contact with said resistor film, said method comprising:

a step of electrolyzing a pyrophosphate bath by using separate anodes of copper and nickel while distributing a plating current between the copper anode and the nickel anode at a predetermined ratio, thereby to deposit copper-nickel alloy with a copper ratio of from 40 to 65 wt %.

7. The method of claim 6, wherein:

said pyrophosphate bath is an aqueous pyrophosphate bath having a pH of 7–9.

* * * * *